(12) United States Patent
Simonsson

(10) Patent No.: US 6,503,032 B1
(45) Date of Patent: Jan. 7, 2003

(54) MILLING MACHINE AND METHOD OF CUTTING A KEYWAY

(76) Inventor: Lennart Simonsson, Segelvägen 22, S-973 41 Luleå (SE)

( * ) Notice: Subject to any disclaimer, the term of this patent is extended or adjusted under 35 U.S.C. 154(b) by 0 days.

(21) Appl. No.: 09/503,318

(22) Filed: Feb. 14, 2000

Related U.S. Application Data

(63) Continuation-in-part of application No. PCT/SE98/01446, filed on Aug. 10, 1998.

(30) Foreign Application Priority Data

Aug. 15, 1997 (SE) ................................................ 9702980

(51) Int. Cl.7 ................................................ B23C 3/30
(52) U.S. Cl. ...................................... 409/132; 409/177
(58) Field of Search ................................ 409/131, 132, 409/177, 178; 408/76, 92

(56) References Cited

U.S. PATENT DOCUMENTS 2,373,341 A * 4/1945 Rowe .......................... 409/177
3,313,210 A * 4/1967 Statter ......................... 409/177
3,370,508 A * 2/1968 Iaia ............................. 409/132
3,466,972 A 9/1969 Strait
3,596,558 A * 8/1971 Rydell .......................... 408/76
3,791,755 A * 2/1974 Warren ......................... 408/76
4,047,827 A * 9/1977 Hougen ........................ 408/76
4,778,314 A * 10/1988 Borys .......................... 409/177
5,185,917 A * 2/1993 Kremen ....................... 409/177

FOREIGN PATENT DOCUMENTS

DE      1262736         3/1968
EP      254108 A1 *     1/1988      ................. 409/177

* cited by examiner

Primary Examiner—Daniel W. Howell
(74) Attorney, Agent, or Firm—Nils H. Ljungman & Associates

(57) ABSTRACT

A keyway is cut in a shaft by means of a cutting unit moved along a guideway on a base that is clamped on the shaft. The cutting unit has a milling head that is slimmer than the desired keyway. The keyway is cut in more than one sweep and the transverse position of the cutting unit is adjusted between the sweeps. In this way, narrow and wide keyways can be cut with the same precision and with one and the same comparatively small machine.

13 Claims, 2 Drawing Sheets

MILLING MACHINE AND METHOD OF CUTTING A KEYWAY

CONTINUING APPLICATION DATA

This application is a Continuation-In-Part application of International Patent Application No. PCT/SE98/01446, filed on Aug. 10, 1998, which claims priority from Sweden Patent Application No. 9702980-5, filed on Aug. 15, 1997. International Application No. PCT/SE98/01446 was pending as of the filing date of the above-cited application. The United States was an elected state in International Application No. PCT/SE98/01446.

BACKGROUND OF THE INVENTION

1. Field of the Invention

This invention relates to a milling machine and to a method of cutting a keyway in a shaft while the shaft is in a machine on site.

2. Background Information

In machines with heavy shafts, for example, steel rolling mills and paper mills, the keyways of the rolls are subject to wear and need to be renewed regularly. One can repair them by cutting them somewhat wider and then use wider keys. The keys and the milling heads are available in standard widths. Alternatively, one can add a weld seam to a keyway and then cut the keyway to the original width.

U.S. Pat. No. 3,466,972 shows and describes a portable milling machine which can be used on a shaft without the shaft being dismounted from a machine. The milling machine has a guideway that is to be clamped on the shaft and a cutting unit with a milling head that can be moved along the guideway. The milling head cuts the entire width of the keyway in one sweep. The transverse forces will be great and can jeopardize the precision by causing lateral movement. Therefore, the machine must be comparatively heavy and the accessibility in narrow places will be reduced.

OBJECT OF THE INVENTION

It is a possible object of the invention to provide for a comparatively small machine that is essentially low in weight and power and has a better accessibility than known art machines but still has the same precision or even better precision than prior art machines.

SUMMARY OF THE INVENTION

This may be achieved in principle by a machine that has a cutting unit that may be laterally displaceable. A milling head with a diameter smaller than the keyway may be used and the keyway may be cut in more than one sweep.

The above-discussed embodiments of the present invention will be described further hereinbelow with reference to the accompanying figures. When the word "invention" is used in this specification, the word "invention" includes "inventions", that is, the plural of "invention". By stating "invention", Applicant does-not in any way admit that the present application does not include more than one patentably and non-obviously distinct invention, and maintains that this application may include more than one patentably and non-obviously distinct invention. Applicant hereby asserts that the disclosure of this application may include more than one invention, and, in the event that there is more than one invention, that these inventions may be patentable and non-obvious one with respect to the other.

DESCRIPTION OF THE PREFERRED EMBODIMENT

Figure 1:
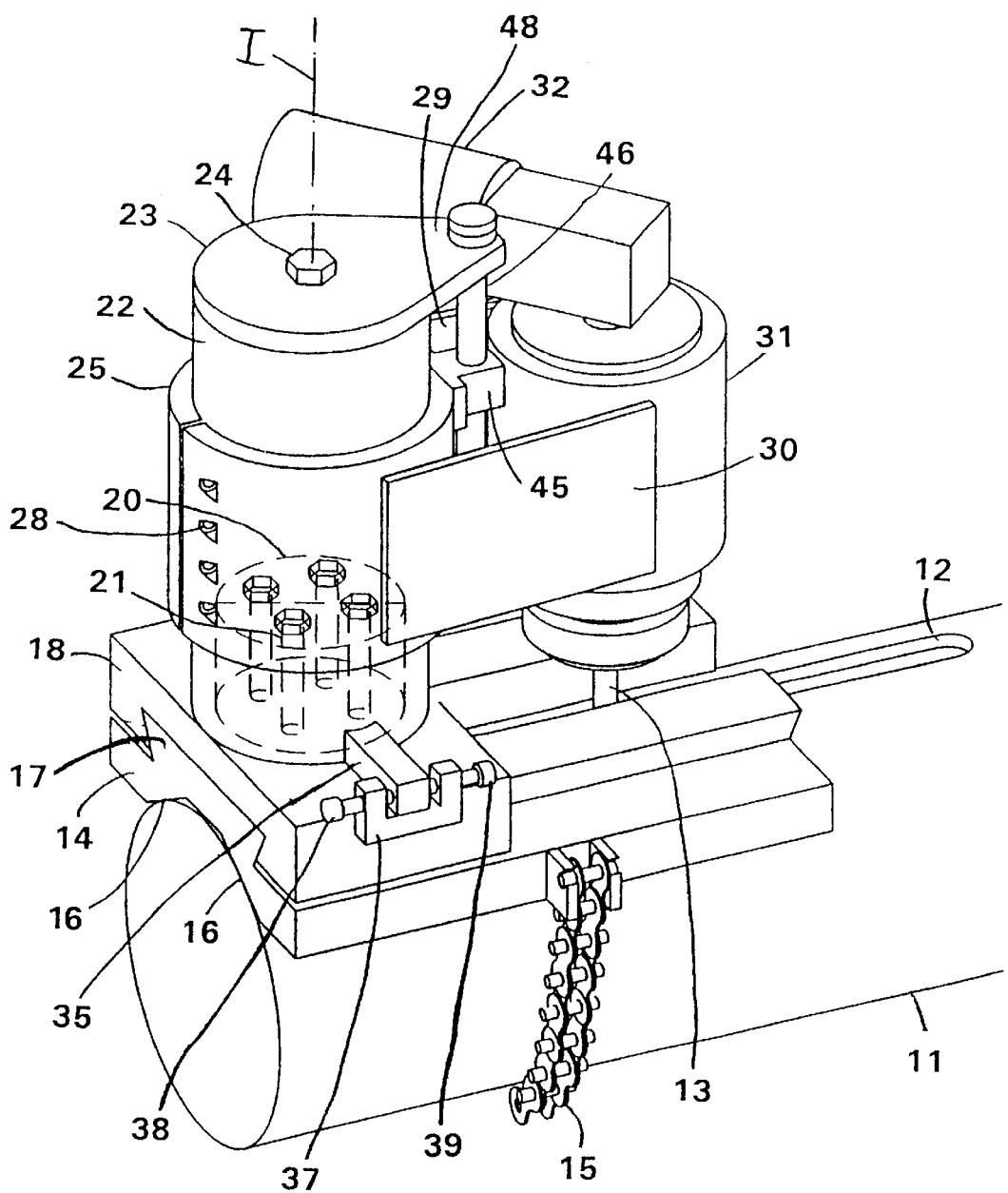
FIG. 1 is a perspective view of a preferred embodiment of a milling machine according to the invention.

In FIG. 1, a shaft 11 is shown in which a keyway 12 is cut by means of a milling head 13. A guiding base 14 is clamped to the shaft 11 by means of a clamping device that includes a chain 15 around the shaft 11. The base 14 has two oblique flat surfaces 16 so that it can be mounted on shafts 11 with various diameters and always be parallel with the shaft 11 independently of the diameter of the shaft 11. The base 14 has a dovetail guideway 17 and a guided base 18 is mounted on the guideway 17 to slide thereon. The guided base 18 has an upstanding circular cylinder 20 of essentially large diameter, which is fixed to the base 18 by means of four rigid screws 21. A sleeve 22 is mounted on the cylinder 20 with an essentially tight fit and is fixed by being clamped to the base 18 by means of a plate 23 and a screw 24 screwed into the cylinder 20. The screw 24 and the cylinder 20 are coaxial. An outer sleeve 25 is mounted on the sleeve 22. The outer sleeve 25 has a longitudinal slot and is clamped on the inner sleeve 22 by means of four screws 28 so that it is held fixed by friction forces. The sleeve 25 has two brackets 29, 30 that carry a cutting unit 31 with the milling head 13. The motor 32 is attached to the cutting unit 31 by means of a gearing apparatus 31a. The guideway 17 has its one end bifurcated so that the milling head 13 can move between the two arms 40, 41 of the guideway 17 as shown.

Figure 2:
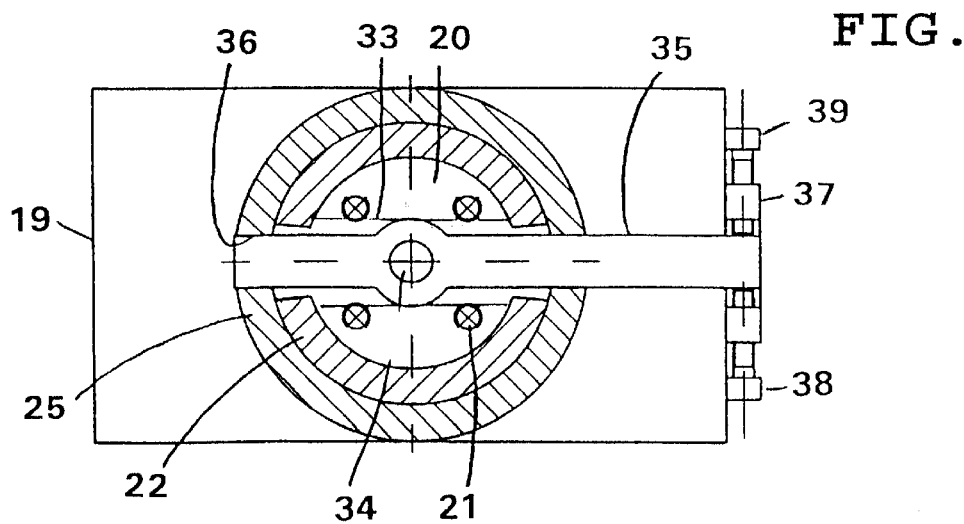
FIG. 2 is a fragmentary section through a part of the machine shown in FIG. 1.

The cylinder 20 has a transverse slot 33 at its bottom and the base 18 has an upstanding cylinder 34 on which a control arm 35 is journaled (FIG. 2). The two sleeves 22, 25 have recesses at their bottoms too in order to make place for the control arm 35, and the control arm has an essentially tight fit to the recess 36 in the outer sleeve 25 so that any turning of the arm 35 will also turn the sleeves 22, 25. A control block 37 has two control screws 38, 39 by which the control arm 35 can be turned into a desired essentially precise position of turning when the screw 24 is somewhat loosened. Then, when the screw 24 is again tightened, the two sleeves 22, 25 will be secured in the new position of turning.

Figure 3:
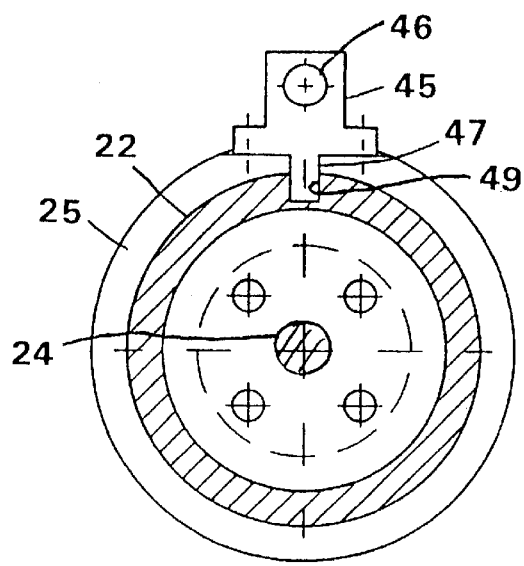
FIG. 3 is a fragmentary section through another part of the machine shown in FIG. 1.

A block 45 is fixed to the outer sleeve 25 and has a threaded through bore for an adjusting screw 46 that extends through a hole in an extended part 48 of the plate 23 (FIGS. 1 and 3). The block 45 has a guide pin 47 that is slideable with an essentially tight fit in a groove 49 in the inner sleeve 22 so that the two sleeves 22, 25 are angularly in fixed position to each other. As an alternative to the pin 47, the two sleeves 22, 25 can be splined together. The adjusting screw 46 can preferably be provided with a vernier scale in order to provide for fine adjustment.

For setting the depth of the milling head 13, one loosens the screws 28 somewhat so that the outer sleeve 25 can slide on the inner sleeve 22. Then, one adjusts the longitudinal position of the outer sleeve 25 on the inner sleeve 22 by turning the adjusting screw 46. The screws 28 are then tightened to lock the two sleeves 22, 25 together.

For adjusting the transverse position of the milling head 13, one loosens the screw 24 somewhat so that the two sleeves 22, 25 will be turnable together as a unit. Then, one adjusts the angular position of the two sleeves 22, 25 by means of the two control screws 38, 39 until the milling head 13 is in the desired position. Finally, the screw 24 is tightened so that the inner sleeve 22 is again clamped to the base 18 and held fixed by friction forces.

When a new keyway 12 is to be cut in a shaft 11, one starts by cutting a narrow groove with a small diameter milling head 13. One may start from a blind predrilled bore or one may use a self-drilling milling head 13 and start drilling the bore by using the milling head 13. The screw 46 is used for the feeding during the drilling. (Thus, the machine can also be used for drilling holes in shafts on places otherwise difficult to access.) After the first sweep, one adjusts the transverse position of the milling head 13 by moving the arm 35 as described while the milling head 13 is in operation and widens the groove in another sweep. Even very wide keyways 12 can be cut in this way in a number of cutting sweeps when a small diameter milling head 13 is used.

By cutting in two or more sweeps, the transverse forces will be comparatively small and a comparatively small machine can be used for cutting large as well as small keyways 12 with the same essentially high precision.

The guided base 18 can be manually fed but a power feeding can also be provided. Suitably, a feeding device can be arranged that is powered by a frequency-controlled hand drill. Any feeding device is, however, not illustrated.

The machine can be used not only for cutting keyways 12 but also for other machining operations, for example, drilling holes in a shaft 11 and milling a flat on a shaft 11. Milling a flat is done in several sweeps in the same way as the cutting of a keyway 12.

Figure 4:
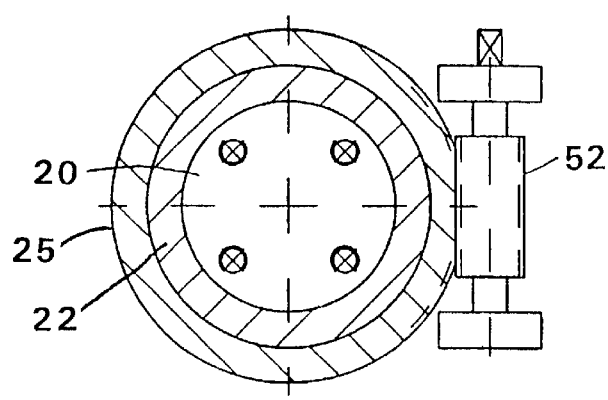
FIG. 4 is a section corresponding to FIG. 2 but showing an alternative design of some elements.

FIG. 4 corresponds to FIG. 2 but shows an alternative embodiment of the device for transverse adjustment. The outer sleeve 25 and a screw 52 form a worm gear by which the two sleeves 22, 25 can be turned when the screw 24 has been loosened. The machine can also be modified in other ways in at least one possible embodiment of the invention. The movement of the cutting unit 31 along a transverse guideway 17 instead of the turning of the sleeves 22, 25 as described can, for example, carry out the transverse movement of the milling head 13.

One feature of the invention resides broadly in the method of cutting a keyway 12 in a shaft 11, while the shaft is on site in a machine, comprising clamping a guiding base 14, that forms a guideway 17, on the shaft and cutting the keyway with a milling head 13 by moving a cutting unit 31 with its milling head 13 along the guideway and thereby along the shaft, characterized in that a milling head 13 is used that has a diameter smaller than the width of the keyway and the keyway is cut in more than one sweep and laterally displaced on the guided base between the milling sweeps.

Another feature of the invention resides broadly in the milling machine for machining operations on a shaft, for example for cutting a keyway 12 on a shaft 11, comprising: a guiding base 14 forming a guideway 17, a clamping device 15 for clamping the guiding base 14 on the shaft 11, a guided base 18 mounted on the guiding base 14 so as to be guided by the guideway 16, 17, and a cutting unit 31 mounted on the guided base 18 and adapted to hold and rotate a milling head 13, characterized in that the cutting unit 31 is laterally displaceable on the guided base 18 and lockable in various lateral positions.

Yet another feature of the invention resides broadly in the milling machine wherein the cutting unit 31 is mounted to be swingable about an axis 1 so as to be laterally displaced.

Still another feature of the invention resides broadly in the milling machine wherein the cutting unit 31 is mounted laterally on a sleeve 22, 25 that is mounted on the guided base 18 so as to be turnable about said axis 1 and lockable in various angular positions.

A further feature of the invention resides broadly in the milling machine wherein said sleeve 22, 25 is journaled on a cylinder 20 that is fix with the guided base 18.

Another feature of the invention resides broadly in the milling machine wherein said sleeve 22, 25 is axially clamped against said guided base 18 to be fixed thereto by means of a screw 24.

Yet another feature of the invention resides broadly in the milling machine wherein the axis of said screw 24 is said axis 1.

Still another feature of the invention resides broadly in the milling machine wherein said sleeve comprises an inner sleeve 22 clamped against the guided base 18 so that it is held fixed by friction forces, and an outer sleeve 25 fixed to the inner sleeve but axially adjustable thereon, said outer sleeve 25 carrying said cutting unit.

A further feature of the invention resides broadly in the milling machine characterized in that the cutting unit 31 is axially adjustably mounted on the guided base 18.

A keyway (12) is cut in a shaft (11) by means of a cutting unit (31) moved along a guideway (16, 17) on a base (14) that is clamped on the shaft. The cutting unit has a milling head (13) that is slimmer than the desired keyway. The keyway is cut in more than one sweep and the transverse position of the cutting unit is adjusted between the sweeps. In this way, narrow and wide keyways can be cut with the same precision and with one and the same comparatively small machine.

Examples of milling machines may be found in U.S. Pat. No. 3,466,972 issued to inventor Strait on Sep. 16, 1969 and entitled "Portable Milling Machine," and Burggräfe's German Patent Publication Auslegeschrift No. 1 262 736, published on Mar. 7, 1968 and assigned to A. und W. Busch K.G.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Sweden Patent Application No. 9702980-5, filed on Aug. 15, 1997, having inventor Lennart Simonsson, and International Application No. PCT/SE98/01446, filed on Oct. 8, 1998, as well as their published equivalents, and other equivalents or corresponding applications, if any, in corresponding cases in Sweden and elsewhere, and the references cited in any of the documents cited herein, are hereby incorporated by reference as if set forth in their entirety herein.

The details in the patents, patent applications and publications may be considered to be incorporable, at Applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A method of cutting a keyway in a shaft using a milling machine while the shaft is on site in a piece of machinery, said method comprising the steps of providing the milling machine comprising a guiding base forming a guideway, a clamping device for clamping the guiding base on the shaft, a guided base being mounted on the guiding base and being configured to be moved on and guided by the guideway, and a cutting unit being mounted on the guided base and being adapted to hold and rotate a milling head, wherein the guided base and the cutting unit mounted on the guided base together are configured to be longitudinally displaced on the guiding base and the cutting unit is configured to be locked in various lateral positions, transverse to the direction of longitudinal displacement, on the guided base, and the cutting unit is mounted to be swingable about an axis so as to be laterally displaced, clamping said guiding base on the shaft and cutting the keyway with a milling head by moving said cutting unit with its, milling head along the guideway and thereby along the shaft, wherein a milling head is used that has a diameter smaller than the width of the keyway and the keyway is cut in more than one sweep and laterally displaced on the guided base between the milling sweeps.

2. A milling machine for machining operations on a shaft comprising: a guiding base forming a guideway, a clamping device for clamping the guiding base on the shaft, a guided base being mounted on the guiding base and being configured to be moved on and guided by the guideway, and a cutting unit being mounted on the guided base and being adapted to hold and rotate a milling head, wherein the guided base and the cutting unit mounted on the guided base together are configured to be longitudinally displaced on the guiding base and the cutting unit is configured to be locked in various lateral positions, transverse to the direction of longitudinal displacement, on the guided base, and the cutting unit is mounted to be swingable about an axis so as to be laterally displaced.

3. The milling machine according to claim 2, wherein the cutting unit is axially adjustably mounted on the guided base.

4. The milling machine according to claim 2, wherein the cutting unit is mounted laterally on a sleeve that is mounted on the guided base so as to be turnable about said axis and lockable in various angular positions.

5. The milling machine according to claim 4, wherein said sleeve is journaled on a cylinder that is fixed with the guided base.

6. The milling machine according to claim 5, wherein said sleeve is axially clamped against said guided base to be fixed thereto by means of a screw.

7. The milling machine according to claim 6, wherein the axis of said screw is said axis.

8. The milling machine according to claim 6, wherein said sleeve comprises an inner sleeve clamped against the guided base so that it is held fixed by friction forces, and an outer sleeve fixed to the inner sleeve but axially adjustable thereon, said outer sleeve carrying said cutting unit.

9. The milling machine according to claim 7, wherein the said sleeve comprises an inner sleeve clamped against the guided base so that it is held fixed by friction forces, and an outer sleeve fixed to the inner sleeve but axially adjustable thereon, said outer sleeve carrying said cutting unit.

10. The milling machine according to claim 7, wherein the cutting unit is axially adjustably mounted on the guided base.

11. The milling machine according to claim 6, wherein the cutting unit is axially adjustably mounted on the guided base.

12. The milling machine according to claim 5, wherein the cutting unit is axially adjustably mounted on the guided base.

13. The milling machine according to claim 4, wherein the cutting unit is axially adjustably mounted on the guided base.

* * * * *